United States Patent
Tanaka et al.

(10) Patent No.: US 7,525,433 B2
(45) Date of Patent: Apr. 28, 2009

(54) WIRELESS COMMUNICATION MODULE TO BE INSTALLED ON VEHICULAR LICENSE PLATE

(75) Inventors: Yukiomi Tanaka, Takahama (JP); Shingo Yoshida, Ichinomiya (JP)

(73) Assignee: Denso Corporation, Kariya (JP)

(*) Notice: Subject to any disclaimer, the term of this patent is extended or adjusted under 35 U.S.C. 154(b) by 89 days.

(21) Appl. No.: 11/231,098

(22) Filed: Sep. 20, 2005

(65) Prior Publication Data

US 2006/0124736 A1    Jun. 15, 2006

(30) Foreign Application Priority Data

Sep. 21, 2004    (JP)    ............... 2004-273439

(51) Int. Cl.
*G08B 13/14*    (2006.01)
(52) U.S. Cl. ............... 340/572.1; 340/572.8; 40/201
(58) Field of Classification Search ............ 340/572.1, 340/572.8, 572.9; 343/711, 713; 40/201
See application file for complete search history.

(56) References Cited

U.S. PATENT DOCUMENTS

| | | | | |
|---|---|---|---|---|
| 4,001,822 A | * | 1/1977 | Sterzer | 343/713 |
| 4,782,342 A | * | 11/1988 | Walton | 340/572.1 |
| 5,012,602 A | * | 5/1991 | Storey | 40/201 |
| 5,608,391 A | | 3/1997 | Bantli et al. | |
| 6,025,784 A | * | 2/2000 | Mish | 340/693.5 |
| 6,452,507 B1 | * | 9/2002 | Friedman | 340/572.8 |
| 6,758,405 B2 | * | 7/2004 | Look | 235/494 |
| 6,873,297 B1 | * | 3/2005 | Posluszny | 340/693.5 |
| 7,034,688 B2 | * | 4/2006 | Rietzler et al. | 340/572.7 |
| 7,091,860 B2 | * | 8/2006 | Martinez de Velasco Cortina et al. | 340/572.1 |

FOREIGN PATENT DOCUMENTS

| | | |
|---|---|---|
| JP | 2000-289539 | 10/2000 |
| JP | 2001-118099 A | 4/2001 |
| JP | 2003-087399 | 3/2003 |
| JP | 2004-237814 A | 8/2004 |
| JP | 2004-254059 A | 9/2004 |
| JP | 2004-258970 A | 9/2004 |
| JP | 2004-322812 | 11/2004 |

OTHER PUBLICATIONS

Office Action issued in corresponding Chinese patent application No. 200510109937.3 dated Nov. 9, 2007 with English translation.
Office Action dated Dec. 9, 2008 from the Japan Patent Office in the corresponding patent application No. 2004-273439.

* cited by examiner

*Primary Examiner*—John A Tweel, Jr.
(74) *Attorney, Agent, or Firm*—Harness, Dickey & Pierce, PLC

(57) ABSTRACT

A wireless communication module, which is to be installed on a license plate of a vehicle, has a memory device, a wireless communication circuit, a battery and a housing. The memory device stores vehicle information such as a registration number of the vehicle. The wireless communication circuit performs wireless communication with an outer apparatus to exchange the vehicle information. The battery supplies electric power to the memory device and to the wireless communication circuit. The housing receives the memory device, the wireless communication circuit and the battery therein and is to be fixed to the license plate.

4 Claims, 2 Drawing Sheets

WIRELESS COMMUNICATION MODULE TO BE INSTALLED ON VEHICULAR LICENSE PLATE

CROSS REFERENCE TO RELATED APPLICATION

This application is based upon and claims the benefit of priority of Japanese Patent Application No. 2004-273439 filed on Sep. 21, 2004, the content of which is incorporated herein by reference.

FIELD OF THE INVENTION

The present invention relates to a wireless communication module to be installed on a license plate of a vehicle.

BACKGROUND OF THE INVENTION

Currently, a system (so-called an electric license plate system) is under development to transmit and receive various data between a wireless communication unit fixed on a vehicular license plate and outer apparatuses (roadside units) installed on sides of roads for a registration management of vehicles, a traffic control and the like (refer to JP-3236832-B, for example).

Commonly, the wireless communication unit used in this kind of system has a construction provided with units such as a wireless communication portion, a memory device portion and a power source portion. If these units are separately provided, an assembly of the product becomes complex and the units must be connected to each other by a harness and the like.

For example, if the system is constructed in such a manner that the wireless communication unit is operated by a power supply from an outer power source, a power supply cable must be provided to connect the outer power source to the wireless communication unit. This construction requires a wiring work which varies in accordance with types of vehicle, so that a workability of an installation of the wireless communication unit is spoiled and a versatility of the wireless communication unit is limited. Further, the construction that requires the wiring work may limit types of vehicle to which the wireless communication unit can be installed, so as to hinder a prevalence of the product.

SUMMARY OF THE INVENTION

The present invention is achieved in view of the above-described issues, and has an object to provide a wireless communication module to be installed on a vehicular license plate, which is versatile from a viewpoint of an installation.

The wireless communication module on a vehicular license plate has a memory device, a wireless communication circuit, a battery and a housing. The memory device stores a vehicle information such as a registration number of the vehicle. The wireless communication circuit performs a wireless communication with an outer apparatus to exchange the vehicle information. The battery supplies electric power to the memory device and to the wireless communication circuit. The housing receives the memory device, the wireless communication circuit and the battery therein and is to be fixed to the license plate.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

First Embodiment

Figure 1A:
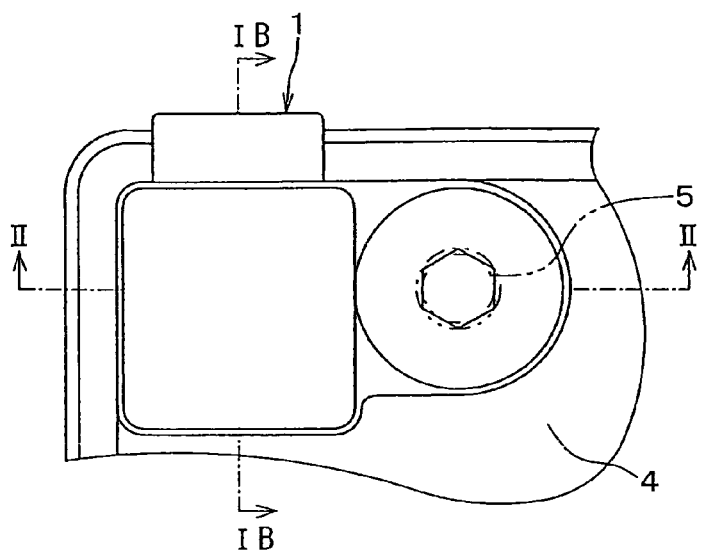
FIG. 1A is a front view showing an installation state of a wireless communication module according to a first embodiment of the present invention.
Figure 1B:
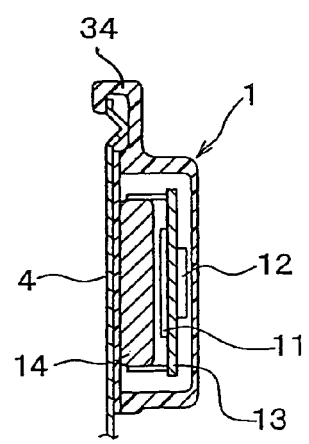
FIG. 1B is a cross-sectional view of the installation state of the wireless communication module of FIG. 1A taken along the line IB-IB.

FIGS. 1A and 1B depict an installation state of a wireless communication module 1 according to a first embodiment of the present invention on a license plate 4 of a vehicle.

As shown in FIG. 1, the wireless communication module 1 is put on a front face of the license plate 4 and screw-fastened together with the license plate 4 by a fastening screw 5 to the vehicle. The wireless communication module 1 is provided with circuit components including an IC chip 11, a wireless communication circuit 12, a printed circuit board 13 and a battery 14, and a housing 30. Each circuit component 11 to 14 is respectively designed in a modulus and installed in the housing 30.

Figure 2:
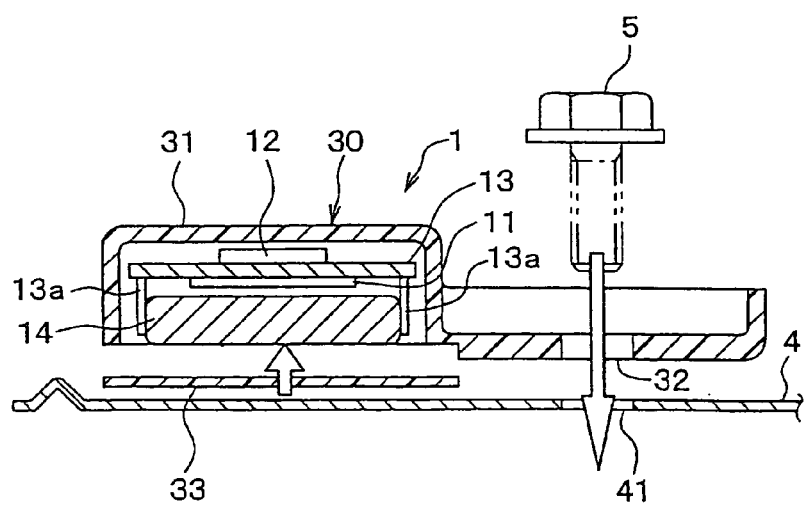
FIG. 2 is a cross-sectional view of the installation state of the wireless communication module of FIG. 1A taken along the line II-II.
Figure 3:
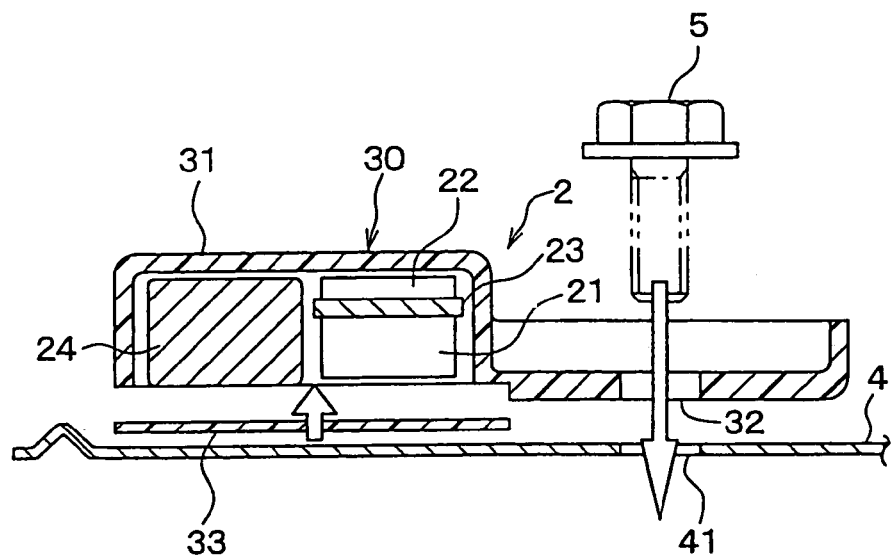
FIG. 3 is a cross-sectional view showing a construction of a wireless communication module according to a second embodiment of the present invention.

FIG. 2 depicts a cross-sectional view of the wireless communication module 1 taken along a line II-II in FIG. 1A.

On a front face of the printed circuit board 13 is mounted the wireless communication circuit 12, and on a rear face of the printed circuit board are mounted the IC chip 13 and electrode terminals 13a for the battery 14.

The IC chip 11 is provided with a memory device (not shown) to store vehicle information including a vehicular specification, a license plate number and so on.

The wireless communication circuit 12 is provided with an antenna (not shown) to execute wireless communications via the antenna with roadside units (outer apparatuses) installed on road sides and so on. The wireless communication circuit 12 executes the wireless communications in accordance with the vehicle information such as a vehicle identification information stored in the memory device of the IC chip 11.

The battery 14 is composed of a low-profile shaped primary cell, and held by the electrode terminals 13a fixed to the battery 14. The battery 14 supplies electric power to the IC chip 11 and to the wireless communication circuit 12.

The wireless communication module 1 according to the present invention has a stacking construction in which the circuit components 11 to 14 are stacked in an order of the battery 14, the IC chip 11, the printed circuit board 13 and the wireless communication circuit 12.

The housing 30 is made of a highly radiation-transmitting resinous material. The housing 30 is provided with a receiving portion 31, a fixing hole 32, a lid portion 33 and a hook 34.

A fastening bolt 5 is inserted into the fixing hole 32 to screw-fasten the housing 30 together with the license plate 4 to the vehicle.

The receiving portion 31 installs the circuit components including the IC chip 11, the wireless communication circuit 12, the printed circuit board 13 and the battery 14 therein.

The wireless communication circuit 12 is disposed in the housing 30 in such a manner that the antenna of the wireless communication circuit 12 is placed at a frontward side of the vehicle in a state that the wireless communication module 1 is installed on the license plate 4 of the vehicle. Thus, the wireless communication circuit 12 can execute the wireless communication with the roadside units installed on road sides in front of the vehicle.

The lid portion 33, which is made of resinous material equivalent to the resinous material forming the receiving portion 31, is fixed at a rear opening of the receiving portion 31 by welding. Thus, the lid portion 33 blocks the rear opening of the receiving portion 31 so as to protect the receiving portion 31 from an incursion of rain water, snow ice and the like.

As described above, the receiving portion 31 installs the circuit components such as the IC chip 11 storing the vehicle information such as the vehicle identification information; however, the receiving portion 31 is sealed by the lid portion 33 welded thereon, so that it is difficult to take the IC chip 11 out of the receiving portion 31. Thus, the vehicle information stored in the memory device of the IC chip 11 cannot be easily rewritten.

The lid portion 33 is welded on the rear opening of the receiving portion 31 in an assembly process of the wireless communication module 1.

The fastening bolt 5 is inserted into the fixing hole 32 of the housing 30 for fixing the license plate 4 to the vehicle, and the housing 30 is screw-fastened together with the license plate 4 to the vehicle by the fastening bolt 5.

As described above, the IC chip 11, the wireless communication circuit 12 and the battery 14 are installed in the housing 30, so as not to require a wiring work of a harness and the like. Thus, the wireless communication module 1 can be easily installed on the license plate 4 of the vehicle, and a product versatility of the wireless communication module 1 is improved.

Further, the wireless communication circuit 12 is provided with the antenna, and the wireless communication circuit 12 is disposed in the housing 30 in such a manner that the antenna of the wireless communication circuit 12 is placed at a frontward side of the vehicle. Thus, the wireless communication can be smoothly executed via the antenna.

Furthermore, the housing 30 is provided with the receiving portion 31 and the lid portion 33 that seals the opening portion of the receiving portion 31. Thus, the receiving portion 31 is protected from rain water, snow ice and the like, and the IC chip 11, the wireless communication circuit 12 and the battery 14 cannot be easily taken out of the receiving portion 31. Accordingly, the vehicle information stored in the IC chip 11 cannot be easily tampered and rewritten.

Second Embodiment

Next, a wireless communication module 2 according to a second embodiment of the present invention is described in focus on different points from the wireless communication module 1 according to the first embodiment. The wireless communication module 2 is provided with circuit components including an IC chip 21, a wireless communication circuit 22, a printed circuit board 23 and a battery 24, and a housing 30 installing these circuit components therein.

In the first embodiment, the IC chip 11 and the wireless communication circuit 12 are placed above the battery 14 in a stacked manner and installed in the receiving portion 31. In the present embodiment, the IC chip 21 and the wireless communication module 22 are placed at a side of the battery 24 and installed in the receiving portion 31 together with the battery 24.

The circuit components including the IC chip 21, the wireless communication circuit 22, the printed circuit board 23 and the battery 24 have different shapes from the IC chip 11, the wireless communication circuit 12, the printed circuit board 13 and the battery 14, however, have substantially equivalent functions to those of the IC chip 11, the wireless communication circuit 12, the printed circuit board 13 and the battery 14.

The layout of the circuit components to place the IC chip 21 and the wireless communication circuit 22 on the side of the battery 24 enables a low-profile shape of the wireless communication module 2. The low-profile shape of the wireless communication module 2 widens a field of view in which an identification range of the registration number on the license plate 4 can be seen, so as to improve a visibility of the registration number indicated on the license plate 4.

The wireless communication circuit 22 is disposed in the housing 30 in such a manner that the antenna of the wireless communication circuit 22 is placed at a frontward side of the vehicle in a state that the wireless communication module is installed on the license plate 4 of the vehicle. Thus, the wireless communication circuit 22 can execute the wireless communication with the roadside units installed on road sides in front of the vehicle.

Other Embodiments

The present invention is not to be limited to the above-described embodiments, and may be modified along a thought of the present invention.

Figure 4:
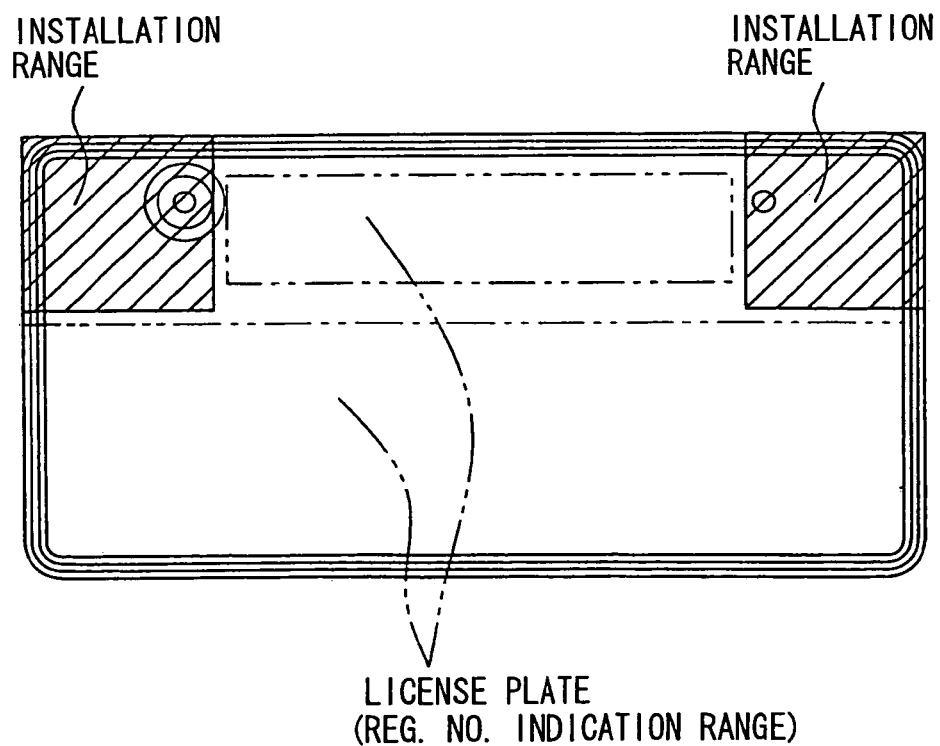
FIG. 4 is a front view showing an installation range on which the wireless communication module according to the present invention can be installed.

In the above-described embodiments, the wireless communication modules 1, 2 are fixed on the top-left portion of the license plate 4. The wireless communication module according to the present invention can be fixed not only on the top-left portion of the license plate 4, but naturally also on a top-right portion of the license plate 4, for example. In installing the wireless communication module on the license plate, it is desirable that the wireless communication module is placed on the shaded ranges in FIG. 4 so that the wireless communication module does not hide the indication range of the registration number on the license plate.

In the above-described embodiments, the lid portion 33 is welded to the receiving portion 31 to block the rear opening of the receiving portion 31, however the present invention does not limited to this construction. For example, the lid portion 33 may be glued or screw-fastened to the receiving portion.

In the above-described embodiments, a primary cell is adopted for the batteries 14, 24, however, a secondary cell may be used in the wireless communication module according to the present invention. In this case, it is useful that the lid portion 33 is removably attached to the receiving portion 31 by a screw-fastening and the like, to take the battery out of the receiving portion 31 for charging.

In the above-described embodiments, the wireless communication module is installed on the license plate 4 on the front face of the vehicle. Alternatively, the wireless communication module according to the present invention may be installed on a license plate on a rear face of the vehicle. In this case, the wireless communication module is expected to communicate with the roadside apparatuses in the rear of the vehicle. Thus, it is practical that the wireless communication module 1, 2 has a structure that the antenna of the wireless communication circuit 11, 21 is installed in the housing 30 in such a manner of being placed at a rear side of the vehicle.

Further, the wireless communication module 1, 2 is provided with an antenna to exchange a radio wave with the roadside apparatuses. Alternatively, the wireless communication module may be provided with a light emitting element and a light receiving element so that light signals are transmitted and received by the light emitting and receiving elements. In this case, it is practical that a part of the housing has a transparent portion through which the light signals pass.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wireless communication module to be installed on a license plate of a vehicle, the module comprising:
    a memory device that stores vehicle information;
    a wireless communication circuit that performs a wireless communication with an outer apparatus to exchange the vehicle information;
    a battery that supplies electric power to the memory device and to the wireless communication circuit; and
    a housing that receives the memory device, the wireless communication circuit and the battery therein and is to be fixed to the license plate, the housing accommodating the battery, the memory device and the wireless communication circuit, the housing being smaller than the license plate, fixed to a front side of the license plate and separate from the license plate; wherein
    the housing includes means for preventing removal of the module from the license plate, the preventing means including a hook defining a first surface adapted to contact a front face of the license plate and a second surface adapted to contact a rear face of the license plate, the first surface being opposite to the second surface.

2. The wireless communication module according to claim 1, wherein the memory device and the wireless communication circuit have a stacked construction, the wireless communication circuit being adapted to be located furthest from the license plate.

3. The wireless communication module according to claim 2, wherein the memory device is disposed between the battery and the wireless communication circuit.

4. The wireless communication module according to claim 2, wherein the battery is disposed adjacent the memory device.

* * * * *